(12) United States Patent
Yuan et al.

(10) Patent No.: US 8,788,539 B2
(45) Date of Patent: Jul. 22, 2014

(54) METHOD AND APPARATUS FOR STORING NODE

(75) Inventors: Changwen Yuan, Shenzhen (CN); Jun Shu, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 13/981,427

(22) PCT Filed: Dec. 22, 2011

(86) PCT No.: PCT/CN2011/084444
§ 371 (c)(1),
(2), (4) Date: Jul. 24, 2013

(87) PCT Pub. No.: WO2012/100613
PCT Pub. Date: Aug. 2, 2012

(65) Prior Publication Data
US 2013/0325798 A1    Dec. 5, 2013

(30) Foreign Application Priority Data

Jan. 25, 2011    (CN) .......................... 2011 1 0026621

(51) Int. Cl.
*G06F 17/30* (2006.01)
*G06F 15/16* (2006.01)

(52) U.S. Cl.
USPC .......................................... 707/797; 707/830

(58) Field of Classification Search
USPC ................................................. 707/797, 830
See application file for complete search history.

(56) References Cited

U.S. PATENT DOCUMENTS

| 5,276,872 A * | 1/1994 | Lomet et al. .......................... 1/1 |
| 2004/0172416 A1* | 9/2004 | Murakami et al. .......... 707/104.1 |
| 2007/0130171 A1* | 6/2007 | Hanckel et al. ............... 707/100 |
| 2011/0246457 A1* | 10/2011 | Dong et al. .................... 707/725 |

FOREIGN PATENT DOCUMENTS

| CN | 101706827 A | 5/2010 |
| CN | 101714161 A | 5/2010 |
| CN | 101794259 A | 8/2010 |

* cited by examiner

*Primary Examiner* — Alex Gofman
(74) *Attorney, Agent, or Firm* — Dilworth & Barrese, LLP.

(57) ABSTRACT

The present invention discloses a method and apparatus for storing node, pertaining to the field of the Internet communications. The method includes: receiving a write operation request and a node from a client; storing the node in a memory and setting the update time of the node as the time of receiving the node; and relocating one or more nodes from the memory to a file according to the update time of each of the nodes in the memory. The apparatus includes: a receiving module, a storage module, and a relocating module. The present invention can reduce the frequency of loading and relocating nodes to and from a memory, and improve performance of a server.

15 Claims, 3 Drawing Sheets

METHOD AND APPARATUS FOR STORING NODE

FIELD OF THE INVENTION

The present invention relates to the field of internet communications, and in particular, to a method and apparatus for storing node.

BACKGROUND OF THE INVENTION

Microblog is a platform for sharing, spreading and acquiring information based on a user relationship. A user posts a message in Microblog, and a client generates a node for the message. The node is used to store relevant information of the message. In Microblog, the user may either forward or comment on the message corresponding to a node to acquire a child node of the node, the client sends the acquired new node to a server, and the server receives the node and stores the node by using a method for storing node.

Currently, a conventional method for storing node is specifically as follows: A storage medium is firstly divided into a memory and a file, where the memory is used to store nodes that are frequently accessed by a user; upon receiving a node from a client, a server firstly stores the received node in the file; when the user requests access to some nodes, these requested nodes are firstly searched for from the memory; and if a requested node is not stored in the memory, the requested node is searched for from the file and returned to the user, and meanwhile the acquired nodes are loaded to the memory. It should be noted that since the memory has a limited space, each time a node is loaded thereto, another node also needs to be relocated from the memory.

During the implementation of the present invention, the inventors find that the prior art has at least the following problems:

The server firstly stores received new nodes in the file. These nodes are loaded to the memory when being read by a user. If a message is very popular in Microblog, users will frequently forward or comment on the popular message in Microblog. Therefore, the node corresponding to the popular message has a large number of child nodes. When the node of the message and the large number of child nodes of the node are read, these large number of nodes will be loaded to the memory. In this case, a large number of other nodes need to be relocated from the memory. However, the nodes stored in the memory are all nodes that are frequently accessed by users. The relocated nodes may be immediately reloaded to the memory due to access by users, which still require that some nodes be relocated from the memory. In this way, a vicious circle is such formed that the frequency of loading nodes to or relocating nodes from the memory is increasing, until up to the ceiling, and performance of the server is reduced.

SUMMARY OF THE INVENTION

To reduce the frequency of loading and relocating nodes to and from a memory, and improve performance of a server, the present invention provides a method for storing node. The technical solutions are as follows:

A method for storing a node is provided, where the method includes:

receiving a write operation request and a node from a client;

storing the node in a memory and setting the update time of the node as the time of receiving the node; and relocating one or more nodes from the memory to a file according to the update time of each of the nodes in the memory.

if the node is a child node, the storing the node in a memory and setting the update time of the node as the time of receiving the node specifically includes:

extracting the index of the child node and the index of a root node of the child node from the child node, and storing the extracted indexes in a mapping relationship between the indexes of root nodes and the indexes of child nodes;

determining, according to the index of the root node, whether the root node of the child node is stored in the memory;

if the root node of the child node is stored in the memory, storing the child node in the memory and setting the update time of the node as the time of receiving the child node; and if the root node of the child node is not stored in the memory, creating a root node of the child node and setting the index of the created root node as the index of the root node, caching the index of the root node in a write event space, storing the child node and the created root node in the memory, and setting both the update time of the created root node and the update time of the child node as the time of receiving the node.

after the storing the child node in the memory and setting the update time of the node as the time of receiving the child node, the method further includes: periodically scanning each of the indexes of root nodes stored in the write event space, searching for a corresponding root node from the file and from the memory according to each of scanned indexes of the root nodes, and combining the content of each of the root nodes retrieved from the file into that of each of the root nodes retrieved from the memory.

The relocating one or more nodes from the memory to a file according to the update time of each of the nodes in the memory specifically includes:

periodically scanning each of the root nodes in the memory, acquiring child nodes of each of the root nodes, and calculating respectively a time difference between the update time of the root node and the current time, and a time difference between the update time of each of the child nodes and the current time;

if every time difference between the update time of each of the child nodes and the current time exceeds a predetermined time threshold, determining whether the time difference between the update time of the root node and the current node exceeds the predetermined time threshold; if the time difference exceeds the predetermined time threshold, relocating both the root node and the child nodes to the file, and if the time difference does not exceed the predetermined time threshold, relocating the child nodes to the file; and if at least one time difference between the update time of each of the child nodes and the current time does not exceed the predetermined time threshold, relocating the child nodes with the time differences between the update time thereof and the current time exceeding the predetermined time threshold to the file.

The relocating one or more nodes from the memory to a file according to the update time of each of the nodes in the memory specifically includes:

periodically scanning each of the root nodes in the memory, acquiring child nodes of each of the root nodes, and respectively calculating a time difference between the update time of the root node and the current time and a time difference between the update time of each of the child nodes and the current time;

if both the time difference between the update time of the root node and the current time, and the time difference between the update time of each of the child nodes and the current time exceed the predetermined time threshold, relocating the root node and the child nodes to the file;

if the time difference between the update time of the root node and the current time does not exceed the predetermined time threshold, or the number of child nodes with the time differences between the update time thereof and the current time not exceeding the predetermined time threshold is larger than 0 and smaller than or equal to a first threshold, then when the number of child nodes is larger than the first threshold, selecting a first-threshold-equivalent number of child nodes with smallest time difference, and relocating the other child nodes to the file, and when the number of child nodes is smaller than or equal to the first threshold, reserving all the child nodes;

if the number of child nodes with the time differences between the update time thereof and the current time not exceeding the predetermined time threshold is larger than the first threshold, and smaller than or equal to a second threshold, relocating the child nodes with the time differences exceeding the predetermined time threshold from the child nodes to the file; and if the number of child nodes with the time differences between the update time thereof and the current time not exceeding the predetermined time threshold is larger the second threshold, selecting a second-threshold-equivalent number of child nodes with smallest time difference from the child nodes, and relocating the unselected child nodes to the file.

The method further includes:

if both the time difference between the update time of the root node and the current time, and the time difference between the update time of each of the child nodes of the root node and the current time exceed the predetermined threshold, relocating the root node and the child nodes of the root node to the file.

The method further includes:

receiving a read operation request from the client, where the request carries the index of a node, and determining, according to the index of the node, whether a corresponding node is stored in the memory; and if no corresponding node is stored in the memory, searching for a read count in a mapping relationship between indexes of stored nodes and read counts according to the index of the node; if no corresponding read count is found, setting a read count, and storing the index of the node and the set read count in the mapping relationship between the indexes of the stored nodes and the read counts; and if a corresponding read count is found, increasing the found read count.

After the increasing the round read count, the method further includes:

periodically scanning the index of a node and a read count contained in each record stored in the mapping relationship between the indexes of the stored nodes and the read counts, scoring the nodes corresponding to the scanned indexes according to the scanned read counts, selecting a third-threshold-equivalent number of nodes with highest score, and loading the selected nodes to the memory.

An apparatus for storing a node is provided, where the apparatus includes:

a receiving module, configured to receive a write operation request and a node from a client;

a storage module, configured to store the node in a memory and setting the update time of the node as the time of receiving the node; and a relocating module, configured to relocate one or more nodes from the memory to a file according to the update time of each of the nodes in the memory.

If the node is a child node, the storage module specifically includes:

an extracting unit, configured to extract the index of the child node and the index of a root node of the child node from the child node, and store the extracted indexes in a mapping relationship between the index of root nodes and the index of child nodes;

a searching unit, configured to determine, according to the index of the root node, whether the root node of the child node is stored in the memory;

a setting unit, configured to: if the root node of the child node is stored in the memory, store the child node in the memory and set the update time of the node as the time of receiving the child node; and;

a storage unit, configured to: if the root node of the child node is not stored in the memory, create a root node of the child node and set the index of the created root node as the index of the root node, cache the index of the root node in a write event space, store the child node and the created root node in the memory, and set both the update time of the created root node and the update time of the child node as the time of receiving the node.

The storage unit includes:

a combining subunit, configured to periodically scan each of the indexes of root nodes stored in the write event space, search for a corresponding root node from the file and from the memory according to each of scanned indexes of the root nodes, and combine the content of each of the root nodes retrieved from the file into that of each of the root nodes retrieved from the memory.

The storage module specifically includes:

a first scanning unit, configured to periodically scan each of the root nodes in the memory, acquire child nodes of each of the root nodes, and calculate respectively a time difference between the update time of the root node and the current time, and a time difference between the update time of each of the child nodes and the current time;

a first relocating unit, configured to: if every time difference between the update time of each of the child nodes and the current time exceeds a predetermined time threshold, determine whether the time difference between the update time of the root node and the current node exceeds the predetermined time threshold; if the time difference exceeds the predetermined time threshold, relocate both the root node and the child nodes to the file, and if the time difference does not exceed the predetermined time threshold, relocate the child nodes to the file; and a second relocating unit, configured to: if at least one time difference between the update time of each of the child nodes and the current time does not exceed the predetermined time threshold, relocate the child nodes with the time differences between the update time thereof and the current time exceeding the predetermined time threshold to the file.

The storage module specifically includes:

a second scanning unit, configured to periodically scan each of the root nodes in the memory, acquire child nodes of each of the root nodes, and respectively calculate a time difference between the update time of the root node and the current time and a time difference between the update time of each of the child nodes and the current time;

a third relocating unit, configured to: if both the time difference between the update time of the root node and the current time, and the time difference between the update time of each of the child nodes and the current time exceed the predetermined time threshold, relocate the root node and the child nodes to the file;

a fourth relocating unit, configured to: if the time difference between the update time of the root node and the current time does not exceed the predetermined time threshold, or the number of child nodes with the time differences between the update time thereof and the current time not exceeding the predetermined time threshold is larger than 0 and smaller than or equal to a first threshold, then when the number of child nodes is larger than the first threshold, select a first-threshold-equivalent number of child nodes with smallest time difference, and relocate the other child nodes to the file, and when the number of child nodes is smaller than or equal to the first threshold, reserve all the child nodes;

a fifth relocating unit, configured to: if the number of child nodes with the time differences between the update time thereof and the current time not exceeding the predetermined time threshold is larger than the first threshold, and smaller than or equal to a second threshold, relocate the child nodes with the time differences exceeding the predetermined time threshold from the child nodes to the file; and a sixth relocating unit, configured to: if the number of child nodes with the time differences between the update time thereof and the current time not exceeding the predetermined time threshold is larger the second threshold, select a second-threshold-equivalent number of child nodes with smallest time difference from the child nodes, and relocate the unselected child nodes to the file.

The storage module further includes:

a seventh relocating unit, configured to: if both the time difference between the update time of the root node and the current time, and the time difference between the update time of each of the child nodes of the root node and the current time exceed the predetermined threshold, relocate the root node and the child nodes of the root node to the file.

The apparatus further includes:

a reading module, configured to: receive a read operation request from the client, where the request carries the index of a node, and determine, according to the index of the node, whether a corresponding node is stored in the memory; if no corresponding node is stored in the memory, searching for a read count in a mapping relationship between indexes of stored nodes and read counts according to the index of the node; and if no corresponding read count is found, set a read count, and store the index of the node and the set read count in the mapping relationship between the indexes of the stored nodes and the read counts; and if a corresponding read count is found, increase the found read count.

The apparatus further includes:

a loading module, configured to periodically scan the index of a node and a read count contained in each record stored in the mapping relationship between the indexes of the stored nodes and the read counts, score the nodes corresponding to the scanned indexes according to the scanned read counts, select a third-threshold-equivalent number of nodes with highest score, and load the selected nodes to the memory.

According to embodiments of the present invention, a node is received from a client, and stored in a memory, the update time of the node is set, and one or more nodes are relocated from the memory to a file according to the update time of each of the nodes in the memory. The number of nodes corresponding to messages posted by users each day falls within a specific range, and therefore the number of nodes received by a server from the client falls within a specific range. The received nodes are stored in the memory. In this way, the number of nodes relocated from the memory each day also falls within a specific range, thereby reducing the frequency of relocating nodes from the memory. In addition, by relocating one or more nodes from the memory to the file according to the update time of each of the nodes, nodes that are not accessed frequently are relocated from the memory to the file, thereby reducing the frequency of loading nodes from the file to the memory, and improving performance of the server.

DETAILED DESCRIPTION OF THE INVENTION

To make the objectives, technical solutions, and advantages of the present invention clearer, the embodiments of the present invention are described in detail below with reference to the accompanying drawings.

Embodiment 1

Figure 1:
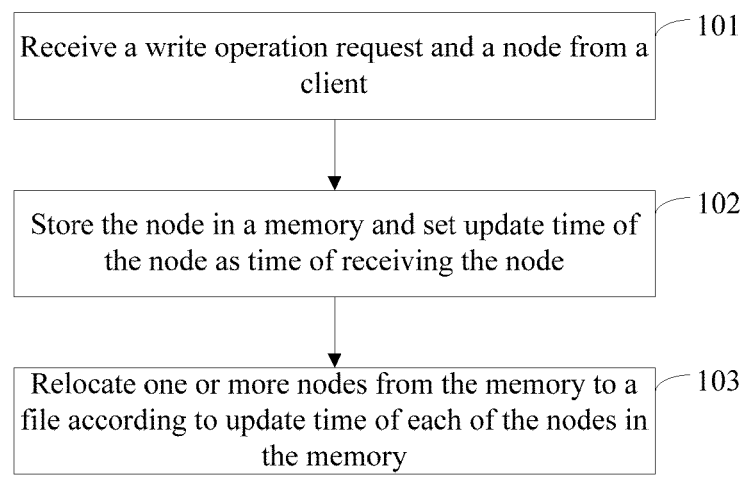
FIG. 1 is a flowchart of a method for storing node according to Embodiment 1 of the present invention.

As illustrated in FIG. 1, this embodiment provides a method for storing node, including the following steps:

step 101: receiving a write operation request and a node from a client;

step 102: storing the node in a memory and setting the update time of the node as the time of receiving the node; and step 103: relocating one or more nodes from the memory to a file according to the update time of each of the nodes in the memory.

According to this embodiment of the present invention, a node is received from a client, and stored in a memory, the update time of the node is set, and one or more nodes are relocated from the memory to a file according to the update time of each of the nodes in the memory. The number of nodes corresponding to messages posted by users each day falls within a specific range, and therefore the number of nodes received by a server from the client falls within a specific range. The received nodes are stored in the memory. In this way, the number of nodes relocated from the memory each day also falls within a specific range, thereby reducing the frequency of relocating nodes from the memory. In addition, by relocating one or more nodes from the memory to the file according to the update time of each of the nodes, nodes that are not accessed frequently are relocated from the memory to the file, thereby reducing the frequency of loading nodes from the file to the memory, and improving performance of the server.

Embodiment 2

This embodiment provides a method for storing node. A user can post an original message in Microblog, a client generates a node A corresponding to the original message, the node A stores relevant information of the original message, where the relevant information shows when the original message was posted, or how many times it was forwarded. The user can also forward or comment on the original message to acquire a child node B of the node A corresponding to the original message, and the user can also forward or comment on the node B to acquire a child node C of the node B. Therefore, the node A is the root node of the node B and the node C, the node A is also the parent node of the node B, and the node B is the parent node of the node C. Any user can forward or comment on the root node A corresponding to the original message and each of the child nodes of the root node A. In this way, the number of child nodes under the root node A may be infinitely increasing.

Figure 2:
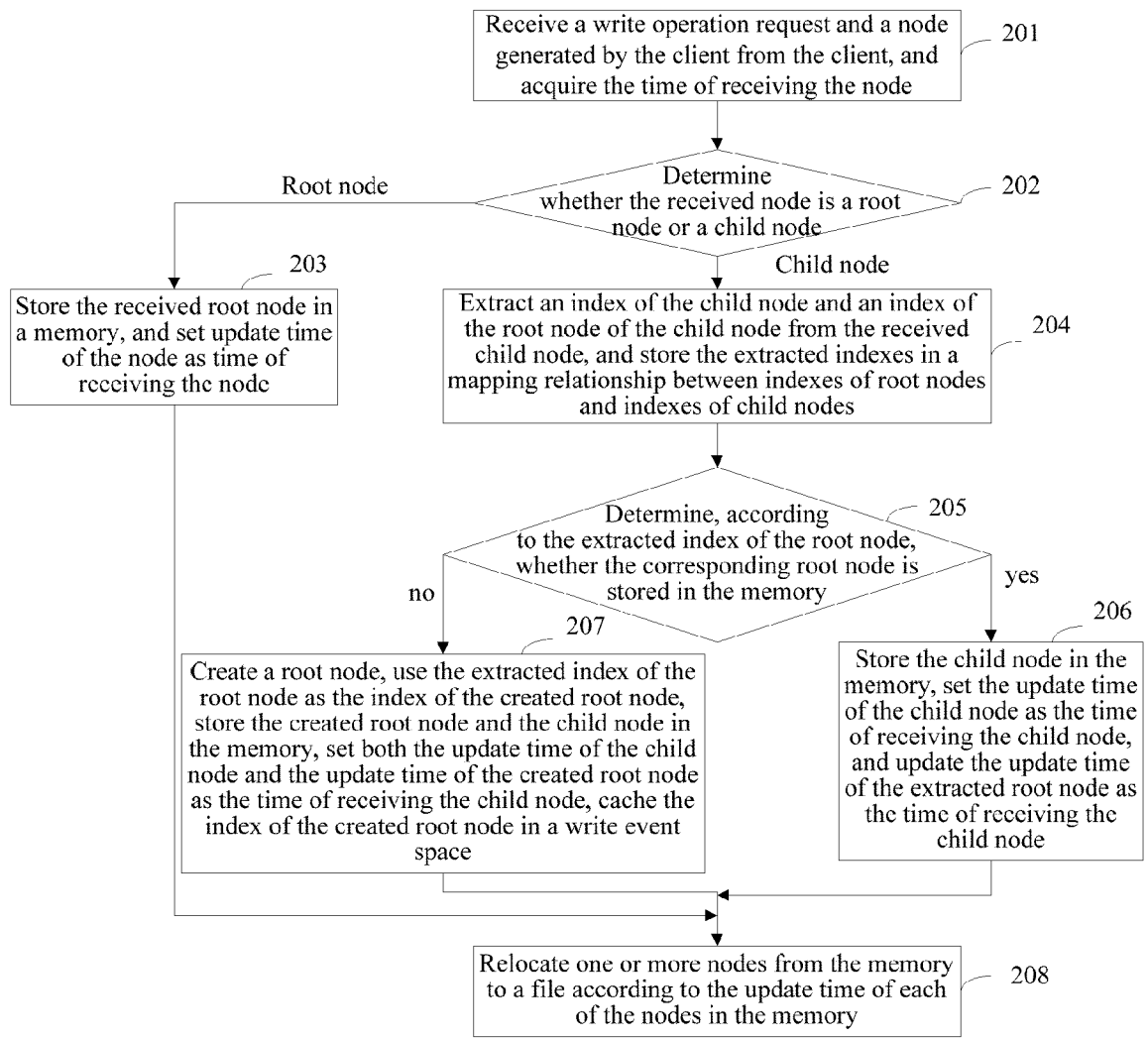
FIG. 2 is a flowchart of a method for storing node according to Embodiment 2 of the present invention.

When the user posts, forwards, or comments on a message in Microblog, the client will generate a new node, and send the generated new node to a server. The server receives the node from the client and stores the node by using the method according to this embodiment. Referring to FIG. 2, the method includes:

Step 201: Receiving a write operation request and a node generated by the client from the client, and acquires the time of receiving the node.

The client assigns an index to the node when generating the node. If the generated node is a root node corresponding to the original message posted by the user, the root node includes its own index; and if the generated node is a child node of a node, the child node includes not only its own index, but also the index of a parent node and the index of the root index.

For example, if the client generates a root node A corresponding to the original message and assigns an index IDA to the root node A, then the root node A includes its own index IDA; when the user forwards or comments on the root node A, the client generates a child node B of the root node A and assigns an index IDB to the child node B, then the child node B includes not only its own index IDB, but also the index of the parent node and the index IDA of the root node; when the user forwards or comments on the child node B, the client generates a child node C of the child node B and assigns an index IDC to the child node C, then the child node C includes not only its own index IDC, but also the index IDB of the parent node and the index IDA of the root node.

Step 202: Determining whether the received node is a root node or a child node; if a root node, performing step 203, and if a child node, performing step 204.

Specifically, the received node is analyzed. If the received node includes its own index, but does not include the index of a parent node or the index of a root node, it is determined that the received node is a root node; if the received node includes not only its own index, but also the index of the parent node and the index of the root node, it is determined that the received node is a child node.

Step 203: Storing the received root node in a memory, setting the update time of the node as the time of receiving the node, and performing step 208.

For example assume that after the client generates a root node A, the server receives a write operation request and the generated root node A from the client, and acquires that the time of receiving the root node A is TimeA1. The node A is analyzed, and it is determined that the node A only includes its own index. Based on such analysis, it is determined that the node A is a root node. The root node A is stored in the memory, and the update time of the root node A is set to TimeA1.

Step 204: Extracting the index of the child node and the index of the root node of the child node from the received child node, and storing the extracted indexes in a mapping relationship between the indexes of root nodes and the indexes of child nodes.

For example, assume that when the client generates a node B, a write operation request and the generated node B are received from the client, and the acquired time for receiving the node B is TimeB1. The node B is analyzed and it is determined that the node B includes not only its own index, but also the index IDB of a parent node and the index IDA of a root node. Based on such analysis, it is determined that the node B is a child node. The index IDB of the child node B and the index IDA of the root node A of the child node B are extracted from the child node B, and then are stored in a mapping relationship between indexes of root nodes and indexes of child nodes, as listed in Table 1.

TABLE 1

| Index of the Root Node | Index of the Child Node |
|---|---|
| IDA | IDB |
| ... | ... |

Step 205: Determining, according to the extracted index of the root node, whether the corresponding root node is stored in the memory; and if the root node is stored in the memory, performing step 206; and if the root node is not stored in the memory, performing step 207.

Step 206: Storing the child node in the memory, setting the update time of the child node as the time of receiving the child node and updating the update time of the extracted root node as the time of receiving the child node, and performing step 208.

For example, the index IDA of the root node A of the child node B is extracted from the child node B, and the memory is searched according to the index IDA. Assume that the corresponding root node A is retrieved from the memory, then the child node B is stored in the memory and the update time of the child node is set to TimeB1, and the update time of the acquired root node A is updated to TimeB1.

Step 207: Creating a root node, using the extracted index of the root node as the index of the created root node, storing the created root node and the child node in the memory, setting both the update time of the child node and the update time of the created root node as the time of receiving the child node, caching the index of the created root node in a write event space, and performing step 208.

It should be noted that: since the file is so large in capacity that it takes time to search for a root node from the file. However, in this embodiment, when the root node corresponding to the extracted index of the root node is not stored in the memory, a new root node is created directly, where the created root node is a blank node. In this way, there is no need to search for the root node corresponding to the extracted index of the root node from the file. This shortens the time used for storing the node and improves node storage efficiency. In addition, in this step, the created root node is a blank root node.

If another write operation request and another node generated by the client are received from the client, the received node is stored in the memory by the above mentioned steps 202-207.

For example, if another write operation request and a node C generated by the client are received from the client, the received node C is stored in the memory by according to the above mentioned steps 202-207, specifically: acquiring the time TimeC1 for receiving the node C, analyzing the node C, and determining that the node C includes not only its own index, but also the index IDB of a parent node and the index IDA of a root node. Therefore, it is determined that the node C is a child node, then extracting the index IDC of the child node C and the index IDA of the root node A of the child node C from the child node C, storing the extracted indexes in a mapping relationship between indexes of root nodes and indexes of child nodes, as listed in Table 1, to acquire a result as listed in Table 2, searching for the corresponding root node A according to the index IDA of the root node A, storing the child node C in the memory, setting the update time of the child node C to TimeC1, and updating the update time of the acquired root node A to TimeC1.

TABLE 2

| Index of the Root Node | Index of the Child Node |
|---|---|
| IDA | IDB |
| IDA | IDC |
| ... | ... |

Figure 3:
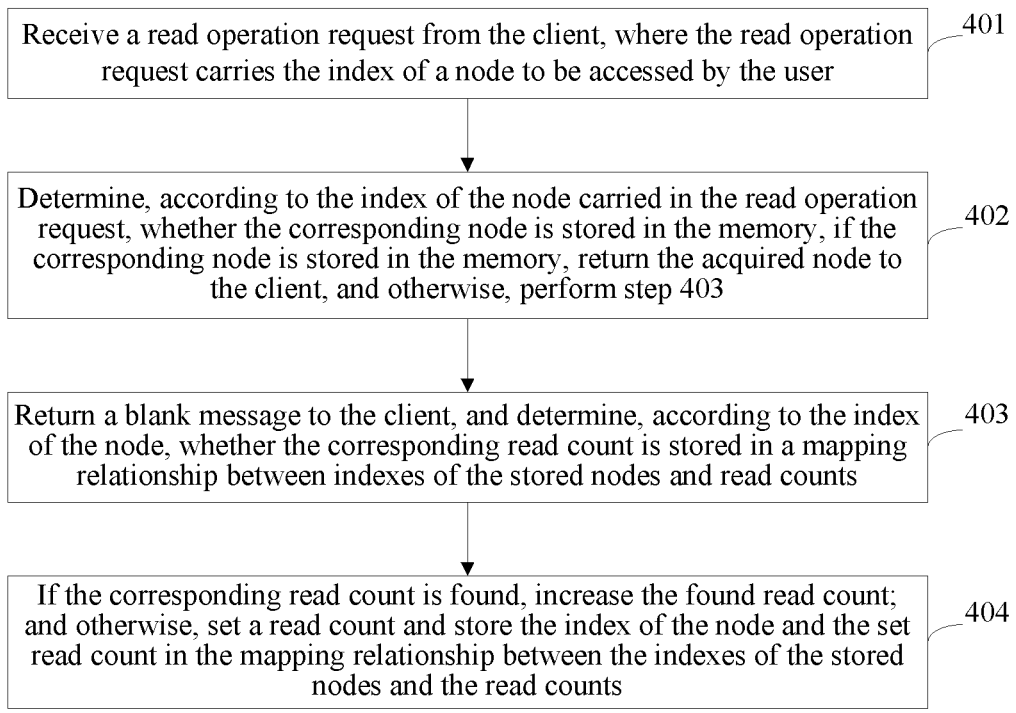
FIG. 3 is an operation flowchart of reading a node according to Embodiment 2 of the present invention.

The user may request access to a node in Microblog. If the user accesses a node, the client sends a read operation request, where the read operation request carries the index of the node. Referring to FIG. 3, a node that the user needs to access can be acquired by the following steps 401-404:

401: receiving a read operation request from the client, where the read operation request carries the index of a node to be accessed by the user;

402: determining, according to the index of the node carried in the read operation request, whether the corresponding node is stored in the memory, if the corresponding node is stored in the memory, returning the acquired node to the client, and otherwise, performing step 403;

403: returning a blank message to the client, and determining, according to the index of the node, whether the corresponding read count is stored in a mapping relationship between indexes of the stored nodes and read counts;

404: if the corresponding read count is found, increasing the found read count; and otherwise, setting a read count and storing the index of the node and the set read count in the mapping relationship between the indexes of the stored nodes and the read times.

Step 208: relocating one or more nodes from the memory to a file according to the update time of each of the nodes in the memory.

Specifically, the server may relocate one or more nodes from the memory to the file by the following steps (1)-(4):

(1) periodically scanning by the server each of the root nodes in the memory to acquire child nodes of the scanned root node from the memory.

The root node includes the index thereof, whereas the child node includes the index thereof, the index of the parent node thereof, and the index of the root node thereof. Therefore, the root node has a different structure from the child node, and thus the root node can be directly scanned from the memory.

Specifically, the server scans a root node, extracts the index of the root node, acquires the corresponding index of the child node from a stored mapping relationship between indexes of root nodes and indexes of child nodes according to the index of the root node, and retrieves the corresponding child node from the memory according to the acquired index of the child node. The acquired child node is a child node of the root node.

(2) respectively calculating the time difference between the update time of the root node and the current time, and the time difference between the update time of each of the child nodes and the current time.

(3) if the time difference between the update time of each of the child nodes and the current time exceeds a predetermined time threshold, determining whether the time difference between the update time of the root node and the current node exceeds the predetermined time threshold; if the time difference exceeds the predetermined time threshold, relocating both the root node and the child nodes to the file, and if the time difference does not exceed the predetermined time threshold, relocating the child nodes to the file.

(4) if at least one time difference between the update time of each of the child nodes and the current time does not exceed the predetermined time threshold, relocating the child nodes with the time differences between the update time thereof and the current time exceeding the predetermined time threshold to the file.

In this embodiment, the root node is the last node that is relocated to the file.

In addition, the server may also relocate one or more nodes from the memory to the file by the following steps (A)-(F):

(A) periodically scanning by the server a root node in the memory to acquire child nodes of the scanned root node from the memory.

Specifically, the server scans a root node, extracts the index of the root node, acquires the index of the child node from a stored mapping relationship between indexes of root nodes and indexes of child nodes according to the index of the root node, and retrieves the corresponding child node from the memory according to the acquired index of the child node. The acquired child node is a child node of the root node.

(B) respectively calculating by the server the time difference between the update time of the root node and the current time, and the time difference between the update time of each of the child nodes and the current time.

(C) if both the time difference between the update time of the root node and the current time, and the time difference between the update time of each of the child nodes and the current time exceed the predetermined time threshold, relocating the root node and the child nodes of the root node to the file.

(D) if the time difference between the update time of the root node and the current time does not exceed the predetermined time threshold, or the number of child nodes with the time differences between the update time thereof and the current time not exceeding the predetermined time threshold is larger than 0 and smaller than or equal to a first threshold, then when the number of child nodes is larger than the first threshold, selecting a first-threshold-equivalent number of child nodes with smallest time difference, and relocating the other child nodes to the file, and when the number of child nodes is smaller than or equal to the first threshold, reserving all the child nodes;

If the time difference between the update time of each of the child nodes of the root node and the current time exceeds the predetermined time threshold, and the time difference between the update time of the root node and the current time does not exceed the predetermined time threshold, then when the number of child nodes of the root node exceeds the first threshold, a first-threshold-equivalent number of child nodes with smallest time difference are selected from the child nodes, and other unselected child nodes are relocated to the file; and when the number of child nodes of the root node does not exceed the first threshold, all the child nodes of the root node are reserved.

If the number of child nodes with the time differences between the update time thereof and the current time exceeding the predetermined time threshold is larger than 0 and smaller than or equal to the first threshold, then when the number of child nodes is larger than the first threshold, a first-threshold-equivalent number of child nodes with smallest time difference are selected from the child nodes of the root node, and other unselected child nodes are relocated to the file; and when the number of child nodes does not exceed the first threshold, all the child nodes are reserved.

(E) if the number of child nodes with the time differences between the update time thereof and the current time not exceeding the predetermined time threshold is larger than the first threshold, and smaller than or equal to a second threshold, selecting the child nodes with the time differences exceeding the predetermined time threshold from the child nodes of the root node, and relocating the selected child nodes to the file.

(F) if the number of child nodes with the time differences between the update time thereof and the current time not exceeding the predetermined time threshold is larger the second threshold, selecting a second-threshold-equivalent number of child nodes with smallest time difference from the child nodes of the root node, and relocating the unselected child nodes to the file.

In this embodiment, it needs to be ensured that for each of the root nodes, the number of child nodes is between a first-threshold and a second-threshold.

The number of messages posted by users in Microblog each day falls within a specific range, and therefore the number of nodes relocated from the memory each day also falls within a specific range. In addition, the nodes that are not accessed or updated within a specific time period are relocated to the file, and these nodes are all seldom accessed by users. Therefore, the probability that these relocated nodes are reloaded to the memory is low. In this way, the frequency of relocating nodes from the memory to the file and loading nodes from the file to the memory is reduced, and performance of the server is improved.

Further, each of the indexes of root nodes stored in the write event space are periodically scanned, according to each of scanned indexes of the root nodes, a corresponding root node is searched for from the file and a corresponding root node is searched for from the memory, and the root node retrieved from the file is integrated into the root node retrieved from the memory. After the index of each of the root nodes stored in the write event space is scanned, the write event space is cleared.

each corresponding root node retrieved from the memory according to the index of each of the indexes of the root nodes in the write event space is a newly created root node, where the newly created root nodes are all blank nodes. Therefore, the content of the corresponding root nodes in the file needs to be integrated to the memory.

Since the file includes a huge number of nodes, searching for a node in the file is a complicated and time-consuming operation. In this embodiment, if it is determined that the root node corresponding to a child node is not stored in the memory, the root node of the child node is not searched for immediately from the file; and instead, the root node of the child node is stored in the write event space, and then the content of the root node corresponding to the index of each of the root nodes in the write event space is integrated uniformly from the file to the memory. In this way, the complicated and time-consuming operations for searching for nodes in the file are asynchronously performed in a uniform manner, thereby improving performance of the server.

Further, the index of a node and a read count contained in each record stored in the mapping relationship between the indexes of the stored nodes and the read counts are periodically scanned, the nodes corresponding to the scanned indexes are scored according to the scanned read counts, a third-threshold-equivalent number of nodes with highest score are selected, and the selected nodes are loaded to the memory. After each of the records in the mapping relationship between the indexes of the nodes and the read counts is scanned, the mapping relationship is cleared.

It takes time to search for a node from the file. In this embodiment, when the user reads a node, if no corresponding node is stored in the memory, a response is immediately returned to the client, and the index of the node is stored and then asynchronously loaded to the memory according to the read count of the node. In this way, the complicated and time-consuming operations for searching for nodes in the file are asynchronously performed in a uniform manner, thereby improving performance of the server.

According to this embodiment of the present invention, a node is received from a client, and stored in a memory, the update time of the node is set, and one or more nodes are relocated from the memory to a file according to the update time of each of the nodes in the memory. The number of nodes corresponding to messages posted by users each day falls within a specific range, and the received nodes are stored in the memory. In this way, the number of nodes relocated from the memory each day also falls within a specific range, thereby reducing the frequency of relocating nodes from the memory. In addition, by relocating one or more nodes from the memory to the file according to the update time of each of the nodes, nodes that are not accessed frequently are relocated from the memory to the file, thereby reducing the frequency of loading nodes from the file to the memory, and improving performance of the server.

Embodiment 3

Figure 4:
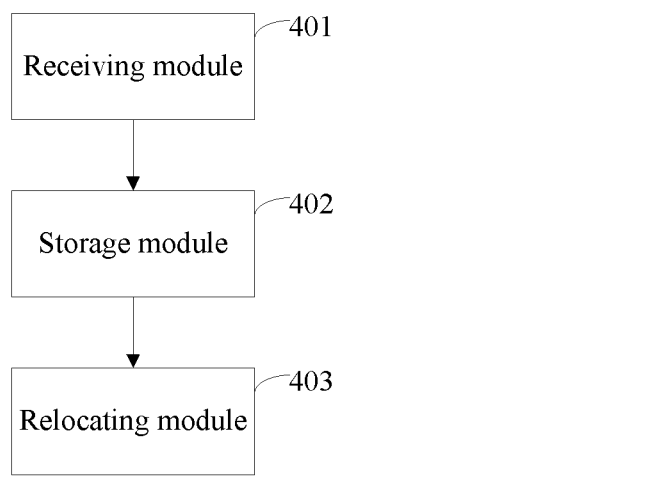
FIG. 4 is a schematic diagram of an apparatus for reading a node according to Embodiment 3 of the present invention.

As illustrated in FIG. 4, this embodiment provides an apparatus for storing node, including:

a receiving module 401, configured to receive a write operation request and a node from a client;

a storage module 402, configured to store the node in a memory and setting the update time of the node as the time of receiving the node; and a relocating module 403, configured to relocate one or more nodes from the memory to a file according to the update time of each of the nodes in the memory.

If the node is a child node, the storage module 402 specifically includes:

an extracting unit, configured to extract the index of the child node and the index of a root node of the child node from the child node, and store the extracted indexes in a mapping relationship between the index of root nodes and the index of child nodes;

a searching unit, configured to determine, according to the index of the root node, whether the root node of the child node is stored in the memory;

a setting unit, configured to: if the root node of the child node is stored in the memory, store the child node in the memory and set the update time of the node as the time of receiving the child node; and;

a storage unit, configured to: if the root node of the child node is not stored in the memory, create a root node of the child node and set the index of the created root node as the index of the root node, cache the index of the root node in a write event space, store the child node and the created root node in the memory, and set both the update time of the created root node and the update time of the child node as the time of receiving the node.

Furthermore, the storage unit includes:

a combining subunit, configured to periodically scan each of the indexes of root nodes stored in the write event space, search for a corresponding root node from the file and from the memory according to each of scanned indexes of the root nodes, and combine the content of each of the root nodes retrieved from the file into that of each of the root nodes retrieved from the memory.

The storage module 403 specifically includes:

a first scanning unit, configured to periodically scan each of the root nodes in the memory, acquire child nodes of each of the root nodes, and calculate respectively a time difference between the update time of the root node and the current time, and a time difference between the update time of each of the child nodes and the current time;

a first relocating unit, configured to: if every time difference between the update time of each of the child nodes and the current time exceeds a predetermined time threshold, determine whether the time difference between the update time of the root node and the current node exceeds the predetermined time threshold; if the time difference exceeds the predetermined time threshold, relocate both the root node and the child nodes to the file, and if the time difference does not exceed the predetermined time threshold, relocate the child nodes to the file; and a second relocating unit, configured to: if at least one time difference between the update time of each of the child nodes and the current time does not exceed the predetermined time threshold, relocate the child nodes with the time differences between the update time thereof and the current time exceeding the predetermined time threshold to the file.

The storage module 403 specifically includes:

a second scanning unit, configured to periodically scan each of the root nodes in the memory, acquire child nodes of each of the root nodes, and respectively calculate a time difference between the update time of the root node and the current time and a time differences between the update time of each of the child nodes and the current time;

a third relocating unit, configured to: if both the time difference between the update time of the root node and the current time, and the time difference between the update time of each of the child nodes and the current time exceed the predetermined time threshold, relocate the root node and the child nodes to the file;

a fourth relocating unit, configured to: if the time difference between the update time of the root node and the current time does not exceed the predetermined time threshold, or the number of child nodes with the time differences between the update time thereof and the current time not exceeding the predetermined time threshold is larger than 0 and smaller than or equal to a first threshold, then when the number of child nodes is larger than the first threshold, select a first-threshold-equivalent number of child nodes with smallest time difference, and relocate the other child nodes to the file, and when the number of child nodes is smaller than or equal to the first threshold, reserve all the child nodes;

a fifth relocating unit, configured to: if the number of child nodes with the time differences between the update time thereof and the current time not exceeding the predetermined time threshold is larger than the first threshold, and smaller than or equal to a second threshold, relocate the child nodes with the time differences exceeding the predetermined time threshold from the child nodes to the file; and a sixth relocating unit, configured to: if the number of child nodes with the time differences between the update time thereof and the current time not exceeding the predetermined time threshold is larger the second threshold, select a second-threshold-equivalent number of child nodes with smallest time difference from the child nodes, and relocate the unselected child nodes to the file.

Furthermore, the storage unit 403 further includes:

a seventh relocating unit, configured to: if both the time difference between the update time of the root node and the current time, and the time difference between the update time of each of the child nodes of the root node and the current time exceed the predetermined threshold, relocate the root node and the child nodes of the root node to the file.

Furthermore, the apparatus further includes:

a reading module, configured to: receive a read operation request from the client, where the request carries the index of a node, and determine, according to the index of the node, whether a corresponding node is stored in the memory; if no corresponding node is stored in the memory, searching for a read count in a mapping relationship between indexes of stored nodes and read counts according to the index of the node; and if no corresponding read count is found, set a read count, and store the index of the node and the set read count in the mapping relationship between the indexes of the stored nodes and the read counts; and if a corresponding read count is found, increase the found read count.

Furthermore, the apparatus further includes:

a loading module, configured to periodically scan the index of a node and a read count contained in each record stored in the mapping relationship between the indexes of the stored nodes and the read counts, score the nodes corresponding to the scanned indexes according to the scanned read count, select a third-threshold-equivalent number of nodes with highest score, and load the selected nodes to the memory.

According to this embodiment of the present invention, a node is received from a client, and stored in a memory, the update time of the node is set, and one or more nodes are relocated from the memory to a file according to the update time of each of the nodes in the memory. The number of nodes corresponding to messages posted by users each day falls within a specific range, and the received nodes are stored in the memory. In this way, the number of nodes relocated from the memory each day also falls within a specific range, thereby reducing the frequency of relocating nodes from the memory. In addition, by relocating one or more nodes from the memory to the file according to the update time of each of the nodes, nodes that are not accessed frequently are relocated from the memory to the file, thereby reducing the frequency of loading nodes from the file to the memory, and improving performance of the server.

It should be noted that, during node storage performed by the apparatus for storing node detection provided in the above embodiments, the apparatus according to the above embodiments is described by only using division of the above functional modules as an example. In practice, the functions may be assigned to different functional modules for implementation as required. To be specific, the internal structure of the apparatus is divided into different functional modules to implement all or part of the above-described functions. In addition, the apparatus and method for storing node provided in the embodiments of the present invention pertain to the same concept, where the specific implementation is elaborated in the method embodiments, which is not be detailed herein any further.

All or part of the steps disclosed in the technical solution according to the embodiments can be implemented by software programming. The programs may be stored in a computer readable storage medium, such as a read only memory (ROM), random access memory (RAM), a magnetic disk, or a compact disc-read only memory (CD-ROM).

Described above are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A method for storing a node, comprising:
receiving a write operation request and a node from a client;
storing the node in a memory and setting update time of the node as time of receiving the node; and
relocating one or more nodes from the memory to a file according to update time of each of the nodes in the memory,
wherein if the node is a child node, the storing the node in a memory and setting update time of the node as time of receiving the node specifically comprises:
extracting an index of the child node and an index of a root node of the child node from the child node, and storing the extracted indexes in a mapping relationship between indexes of root nodes and indexes of child nodes;
determining, according to the index of the root node, whether the root node of the child node is stored in the memory;
if the root node of the child node is stored in the memory, storing the child node in the memory and setting the update time of the node as the time of receiving the child node; and
if the root node of the child node is not stored in the memory, creating a root node of the child node and setting an index of the created root node as the index of the root node, caching the index of the root node in a write event space, storing the child node and the created root node in the memory, and setting both update time of the created root node and update time of the child node as the time of receiving the node.

2. The method according to claim 1, wherein after the storing the child node in the memory and setting update time of the node as time of receiving the child node, the method further comprises:
periodically scanning each of the indexes of root nodes stored in the write event space, searching for a corresponding root node from the file and from the memory according to each of scanned indexes of the root nodes, and combining content of each of the root nodes retrieved from the file into that of each of the root nodes retrieved from the memory.

3. The method according to claim 1, wherein the relocating one or more nodes from the memory to a file according to update time of each of the nodes in the memory specifically comprises:
periodically scanning each of the root nodes in the memory, acquiring child nodes of each of the root nodes, and calculating respectively a time difference between update time of a root node and a current time, and a time difference between update time of each of the child nodes and the current time;
if every time difference between the update time of each of the child nodes and the current time exceeds a predetermined time threshold, determining whether the time difference between the update time of the root node and the current node exceeds the predetermined time threshold;
if the time difference exceeds the predetermined time threshold, relocating both the root node and the child nodes to the file, and if the time difference does not exceed the predetermined time threshold, relocating the child nodes to the file; and
if at least one time difference between the update time of each of the child nodes and the current time does not exceed the predetermined time threshold, relocating the child nodes with the time differences between the update time thereof and the current time exceeding the predetermined time threshold to the file.

4. The method according to claim 3, further comprising:
if both the time difference between the update time of the root node and the current time, and the time difference between the update time of each of the child nodes of the root node and the current time exceed the predetermined threshold, relocating the root node and the child nodes of the root node to the file.

5. The method according to claim 1, wherein the relocating one or more nodes from the memory to a file according to update time of each of the nodes in the memory specifically comprises:
periodically scanning each of the root nodes in the memory, acquiring child nodes of each of the root nodes, and respectively calculating a time difference between update time of a root node and a current time and a time difference between update time of each of the child nodes and the current time;
if both the time difference between the update time of the root node and the current time, and the time difference between the update time of each of the child nodes and the current time exceed a predetermined time threshold, relocating the root node and the child nodes to the file;
if the time difference between the update time of the root node and the current time does not exceed the predetermined time threshold, or the number of child nodes with the time differences between the update time thereof and the current time not exceeding the predetermined time threshold is larger than 0 and smaller than or equal to a first threshold, then when the number of child nodes is larger than the first threshold, selecting a first-threshold-equivalent number of child nodes with smallest time difference, and relocating the other child nodes to the file, and when the number of child nodes is smaller than or equal to the first threshold, reserving all the child nodes;
if the number of child nodes with the time differences between the update time thereof and the current time not exceeding the predetermined time threshold is larger than the first threshold, and smaller than or equal to a second threshold, relocating the child nodes with the time differences exceeding the predetermined time threshold from the child nodes to the file; and
if the number of child nodes with the time differences between the update time thereof and the current time not exceeding the predetermined time threshold is larger the second threshold, selecting a second-threshold-equivalent number of child nodes with smallest time difference from the child nodes, and relocating the unselected child nodes to the file.

6. The method according to claim 5, further comprising:
if both the time difference between the update time of the root node and the current time, and the time difference between the update time of each of the child nodes of the root node and the current time exceed the predetermined threshold, relocating the root node and the child nodes of the root node to the file.

7. The method according to claim 1, further comprising:
receiving a read operation request from the client, wherein the request carries an index of a node, and determining, according to the index of the node, whether a corresponding node is stored in the memory; and
if no corresponding node is stored in the memory, searching for a read count in a mapping relationship between indexes of stored nodes and read counts according to the index of the node; if no corresponding read count is found, setting a read count, and storing the index of the node and the set read count in the mapping relationship between the indexes of the stored nodes and the read counts; and if a corresponding read count is found, increasing the found read count.

8. The method according to claim 7, wherein after the increasing the found read count, the method further comprises:

periodically scanning the index of the node and the read count contained in each record stored in the mapping relationship between the indexes of the stored nodes and the read counts, scoring the nodes corresponding to the scanned indexes according to the scanned read counts, selecting a third-threshold-equivalent number of nodes with highest score, and loading the selected nodes to the memory.

9. An apparatus for storing a node, comprising:

a receiving module, configured to receive a write operation request and a node from a client;

a storage module, configured to store the node in a memory and setting update time of the node as time of receiving the node; and a relocating module, configured to relocate one or more nodes from the memory to a file according to update time of each of the nodes in the memory, wherein if the node is a child node, the storage module specifically comprises:

an extracting unit, configured to extract an index of the child node and an index of a root node of the child node from the child node, and store the extracted indexes in a mapping relationship between indexes of root nodes and indexes of child nodes;

a searching unit, configured to determine, according to the index of the root node, whether the root node of the child node is stored in the memory;

a setting unit, configured to: if the root node of the child node is stored in the memory, store the child node in the memory and set the update time of the node as the time of receiving the child node; and a storage unit, configured to: if the root node of the child node is not stored in the memory, create a root node of the child node and set the index of the created root node as the index of the root node, cache the index of the root node in a write event space, store the child node and the created root node in the memory, and set both the update time of the created root node and the update time of the child node as the time of receiving the node.

10. The apparatus according to claim 9, wherein the storage unit further comprises:

a combining subunit, configured to periodically scan each of the indexes of root nodes stored in the write event space, search for a corresponding root node from the file and from the memory according to each of scanned indexes of the root nodes, and combine the content of each of the root nodes retrieved from the file into that of each of the root nodes retrieved from the memory.

11. The apparatus according to claim 9, wherein the storage module specifically comprises:

a first scanning unit, configured to periodically scan each of the root nodes in the memory, acquire child nodes of each of the root nodes, and calculate respectively a time difference between the update time of a root node and the current time, and a time difference between the update time of each of the child nodes and the current time;

a first relocating unit, configured to: if each time difference between the update time of each of the child nodes and the current time exceeds a predetermined time threshold, determine whether the time difference between the update time of the root node and the current node exceeds the predetermined time threshold; if the time difference exceeds the predetermined time threshold, relocate both the root node and the child nodes to the file, and if the time difference does not exceed the predetermined time threshold, relocate the child nodes to the file; and a second relocating unit, configured to: if at least one time difference between the update time of each of the child nodes and the current time does not exceed the predetermined time threshold, relocate the child nodes with the time differences between the update time thereof and the current time exceeding the predetermined time threshold to the file.

12. The apparatus according to claim 11, wherein the storage unit further comprises:

a seventh relocating unit, configured to: if both the time difference between the update time of the root node and the current time, and the time difference between the update time of each of the child nodes of the root node and the current time exceed the predetermined threshold, relocate the root node and the child nodes of the root node to the file.

13. The apparatus according to claim 9, wherein the storage module specifically comprises:

a second scanning unit, configured to periodically scan each of the root nodes in the memory, acquire child nodes of each of the root nodes, and respectively calculate a time difference between the update time of a root node and a current time and a time difference between the update time of each of the child nodes and the current time;

a third relocating unit, configured to: if both the time difference between the update time of the root node and the current time, and the time difference between the update time of each of the child nodes and the current time exceed a predetermined time threshold, relocate the root node and the child nodes to the file;

a fourth relocating unit, configured to: if the time difference between the update time of the root node and the current time does not exceed the predetermined time threshold, or the number of child nodes with the time differences between the update time thereof and the current time not exceeding the predetermined time threshold is larger than 0 and smaller than or equal to a first threshold, then when the number of child nodes is larger than the first threshold, select a first-threshold-equivalent number of child nodes with smallest time difference, and relocate the other child nodes to the file, and when the number of child nodes is smaller than or equal to the first threshold, reserve all the child nodes;

a fifth relocating unit, configured to: if the number of child nodes with the time differences between the update time thereof and the current time not exceeding the predetermined time threshold is larger than the first threshold, and smaller than or equal to a second threshold, relocate the child nodes with the time differences exceeding the predetermined time threshold from the child nodes to the file; and a sixth relocating unit, configured to: if the number of child nodes with the time differences between the update time thereof and the current time not exceeding the predetermined time threshold is larger the second threshold, select a second-threshold-equivalent number of child nodes with smallest time difference from the child nodes, and relocate the unselected child nodes to the file.

14. The apparatus according to claim 9, further comprising:
a reading module, configured to: receive a read operation request from the client, wherein the request carries the index of a node, and determine, according to the index of the node, whether a corresponding node is stored in the memory; if no corresponding node is stored in the memory, searching for a read count in a mapping relationship between indexes of stored nodes and read counts according to the index of the node; and if no corresponding read count is found, set a read count, and store the index of the node and the set read count in the mapping relationship between the indexes of the stored nodes and the read counts; and if a corresponding read count is found, increase the found read count.

15. The apparatus according to claim 14, further comprising:
a loading module, configured to periodically scan the index of a node and a read count contained in each record stored in the mapping relationship between the indexes of the stored nodes and the read counts, score the nodes corresponding to the scanned indexes according to the scanned read counts, select a third-threshold-equivalent number of nodes with highest score, and load the selected nodes to the memory.

* * * * *